June 6, 1961 L. MELZASSARD 2,986,745
DEVICE FOR ACTUATING HINGED ELEMENTS
Filed Dec. 23, 1957 10 Sheets-Sheet 1

Fig.1

INVENTOR
LOUIS MELZASSARD
BY Irwin S. Thompson
ATTY.

June 6, 1961 L. MELZASSARD 2,986,745
DEVICE FOR ACTUATING HINGED ELEMENTS
Filed Dec. 23, 1957 10 Sheets-Sheet 6

Fig.6

INVENTOR
LOUIS MELZASSARD
BY Irwin S. Thompson
ATTY.

Fig. 7

June 6, 1961  L. MELZASSARD  2,986,745
DEVICE FOR ACTUATING HINGED ELEMENTS
Filed Dec. 23, 1957  10 Sheets-Sheet 8

Fig.8.

INVENTOR
LOUIS MELZASSARD
BY Irwin S. Thompson
ATTY.

United States Patent Office 2,986,745
Patented June 6, 1961

2,986,745
DEVICE FOR ACTUATING HINGED ELEMENTS
Louis Melzassard, Fontvieille, Monaco, assignor to Compagnie Industrielle du Confort, S.A., Monaco
Filed Dec. 23, 1957, Ser. No. 704,631
Claims priority, application France May 9, 1957
6 Claims. (Cl. 4—251)

This invention relates to actuating devices for two hinged members which are arranged to overlie one another and which are both totally mounted at or in the region of corresponding edges. In the following specification and in the appended claims, where reference is made to members, or two hinged members, or a term equivalent to one or the other of these, it is to be understood to refer to the arrangement of two members in the manner above described.

An object of the present invention is to provide a control for actuating the members which does not necessitate the actual manual handling of the two members themselves and may in this sense be considered as a distant control. It is however to be understood that while in the preferred form of the invention this control is pedal operated, this does not exclude manual operation of the control itself.

Another object of the invention is to provide a device for actuating the hinged seat and cover of a sanitary container said device operating to raise the two together in company and thereafter to lower the seat independently of the cover and then lower the cover.

The foregoing and other features of the invention will be more clearly understood from the following description, to be read in conjunction with the accompanying drawings, of several forms of actuating devices including mechanical, hydraulic and electrical controls.

The drawings illustrate the invention as applied to the hinged elements (seat, cover) of a water-closet bowl, but other applications may be envisaged within the framework of the present invention.

In the drawings the trust arm 18, 18' or 18" constitutes the main element (actuated through pedal 37 or button 52 or 74) transmitting movement to the cam device finally rotating on the hinge axis 3.

In all cases illustrated in FIGS. 1 to 10, the device comprises only one single control member (pedal or button) to determine the different movements of the hinged elements (seat 1, cover 2). In the examples described it is assumed that the first action on the control pedal or button produces the simultaneous raising of both members 1 and 2; the second action produces lowering of the seat 1 alone; the third action produces lowering of the cover 2 on to the seat already in the lowered position; the cycle of operation is thus complete, the members 1 and 2 having now returned to their initial lowered position.

Figure 1:
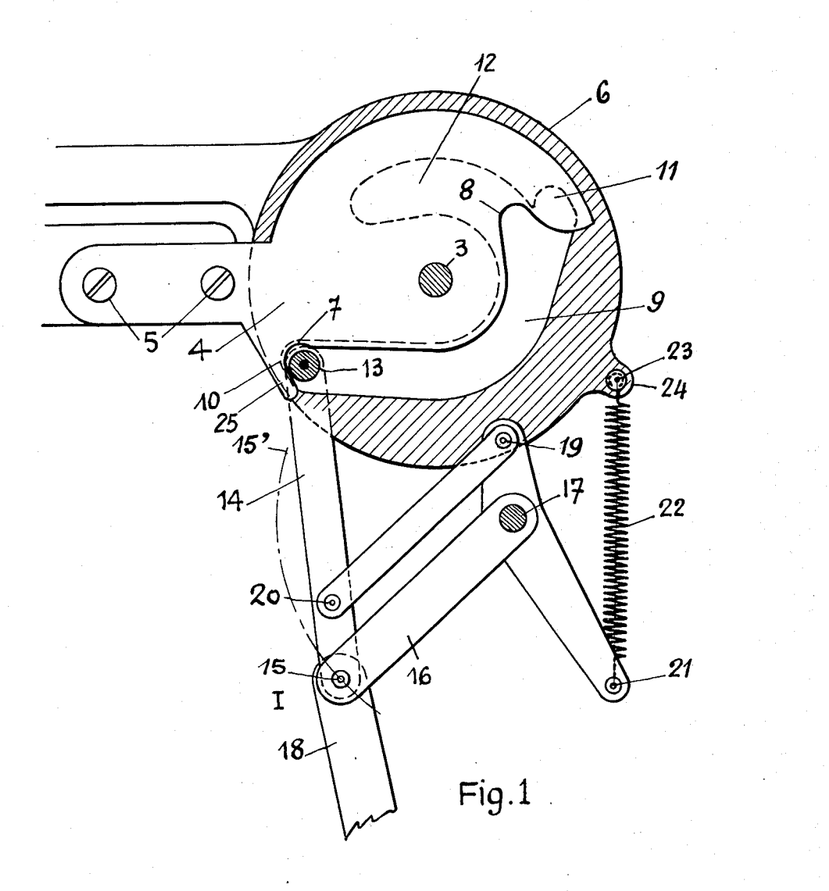
FIG. 1 is an axial view of a cam selector mechanism for two hinged elements with both elements lowered.

Referring firstly to FIG. 1 (initial position), the seat 1 and cover 2 are down; both are rotatably mounted on the same axis of rotation 3 which is normally located above and behind the bowl (not illustrated). The seat 1 and cover 2 are attached to the pivot point 3 by any means known per se, for example by cast lugs provided with holes (not illustrated in the drawings) and by the plate 4 fixed to the straight edge of the seat 1 by screws 5, while the cover 2 pivots upon the pin 3 by means of the cam plate 6 which may be cast together with the cover itself. The cam plate 4 rotates on the pin 3 in front of the plate 6 (as seen by the observer of the drawing). It is recessed following a profile showing two rounded slots 7 and 8, which latter slot 8 is located closer to the pin 3 than the other. The plate 6, in turn, carries a recess 9 profiled substantially like that of the plate 4 but provided with two notches 10 and 11, the latter being closer than the former to the pin 3, and an arc-shaped slot 12. In the initial position (drawn at POS I in FIG. 1), the notches 7 and 10 are practically in alignment.

Furthermore, a cylindrical pin 13 carried at the upper extremity of an arm 14 is intended to follow the recessed profile of the plate 4 and by its axial extension (perpendicular to the plane of the drawing) to enter the recess 9. The arm 14 at its lower extremity rotates at 15 on one extremity of the arm 16, the other extremity of which pivots on the fixed pin 17, so that the joint 15 is capable of describing an arc 15—15' (indicated by dot-dash lines in the figures) when an upward thrust is imparted to it by the main thrust arm 18 which transmits to the selector system the actions of the control members. The joint 15 is the common locus of application of the motive force of one of the three varieties of control means about to be described with reference to FIGS. 5, 6 and 7.

The arm 14 is urged towards the right or left by the articulated parallelogram 15, 17, 19, 20, the side 19, 17 of which is extended, forming an angle at 17, as far as the point of attachment 21 of an extremity of the traction spring 22, the other extremity of which is connected to the hook 23 of the lug 24 on the periphery of the plate 6. On examining FIGS. 1, 2 and 3 it will be seen that this hook, according to the position of the cover 2, will be located at the right (FIG. 1) or at the left (FIGS. 2 and 3) of the fixed pin 17 and that the spring 22 will consequently draw the extremity of the elbow 21, 17, 19 towards the right (FIG. 1) or towards the left (FIGS. 2 and 3); thus, the arm 14 will be urged either towards the left (FIG. 1) or towards the right (FIGS. 2 and 3) by the articulated parallelogram 15, 20, 19, 17 whatever the position of the pivot joint 15 on the arc 15—15'.

It will be appreciated therefore that, if an upward thrust is exerted on the pivot 15 by the arm 18, this thrust will be transmitted by the arm 14 to the pin 13 which tends to move firstly towards the left until it strikes the projection 25 on the member 4, and then engages in the notch 7, 10; this will cause clockwise rotation of the unit comprising the member 4, seat 1, plate 6 and cover 2 (this latter being carried upwards by the seat 1 itself). The seat and cover thus rise until they assume the position shown in FIG. 2 (raised position). The length of the arc 15—15' and the dimensions of the various parts are such that the above-mentioned unit describes an angle of rather more than 90° (in practice 95°), so that a perpendicular passing through the center of gravity of said unit falls to the right of the pivot point 3, which ensures correct balance of the raised hinged elements against a stop-member (not illustrated) placed in a suitable position.

Figure 2:
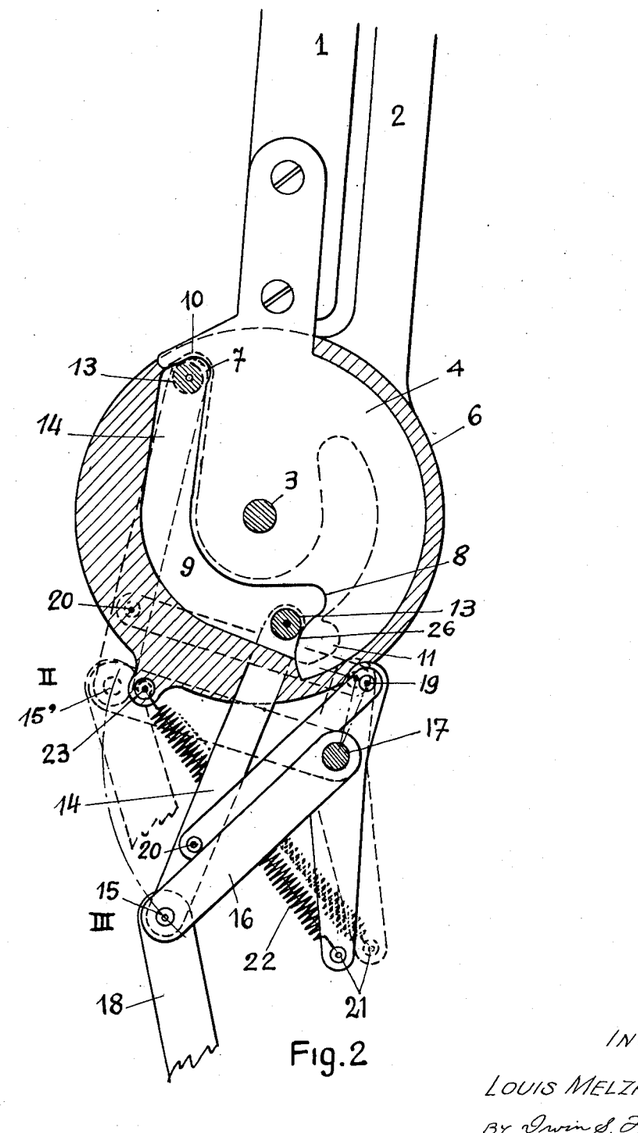
FIG. 2, a similar view with both hinged elements raised.

In this raised position as shown in FIG. 2, the movable elements are shown by dotted lines (POS III) in the position reached after completion of the upward motion along the arc 15—15'. The hook 23 is then so positioned that the pull of the spring 22 is exerted on the securing point 21 towards the left of the fixed pin 17; consequently, the arm 14 is urged towards the right. If at this point the arm 18 descends again (as will be explained later) to a position shown in full lines in FIG. 2 (POS III), the pin 13, sliding along the recess of the member 4 and into the slot 9 of the plate 6 finally strikes against the convex shoulder 26 of the member 4 and is ready to engage in the notch 8 when a further upward thrust occurs of the arm 18. The shoulder 26 prevents the pin 13 from engaging in the notch 11 of the plate 6. A second upward thrust of the arm 18 causes the member 4 to rotate in anti-clockwise direction and the seat 1 is lowered on to the bowl, the cover 2 remaining in the raised position. This is shown in FIG. 3 in which the raised position (POS IV) of the arm 18 is shown dotted; the pin 13 conforming to the recess 12 of the plate 6, does not proceed as far as the notch 8 due to the inclination of the arm 14; the seat returns to the bowl merely by the effect of gravity.

Figure 3:
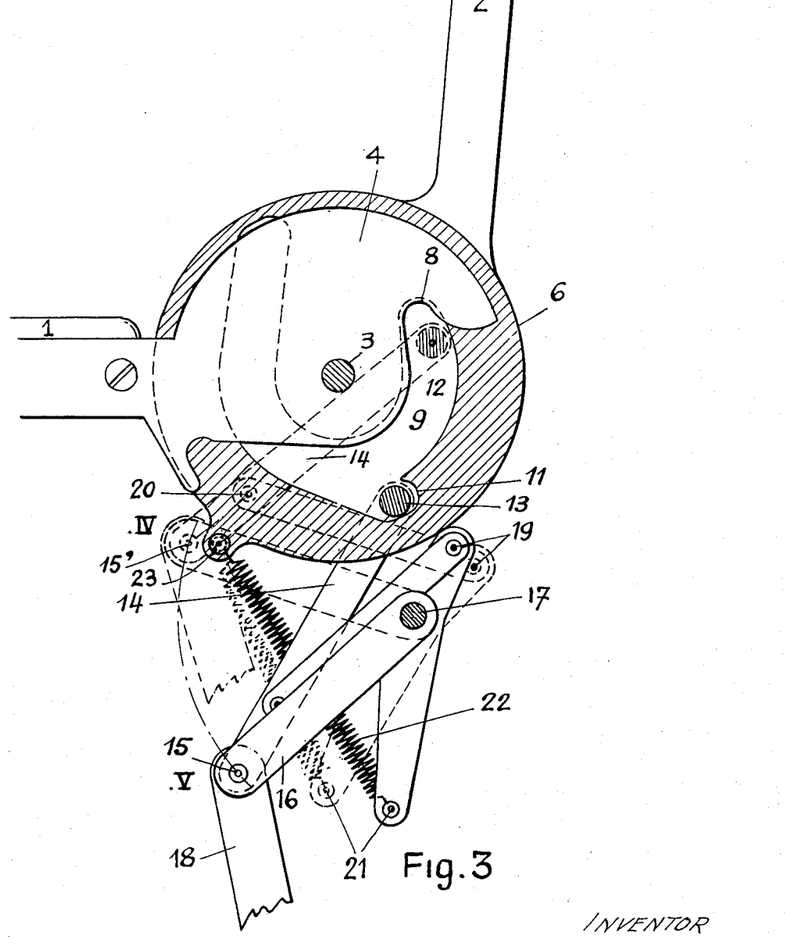
FIG. 3, a similar view with only one of the hinged elements raised.

The arm 14 is still urged towards the right because the hook 23 has not moved; but, when the arm 18 descends once more to arrive at the position shown in full lines in FIG. 3 (POS V), the pin 13 finally reaches the entrance of the notch 11 of the plate 6. The seat is still lowered, the cover still raised.

Figure 4:
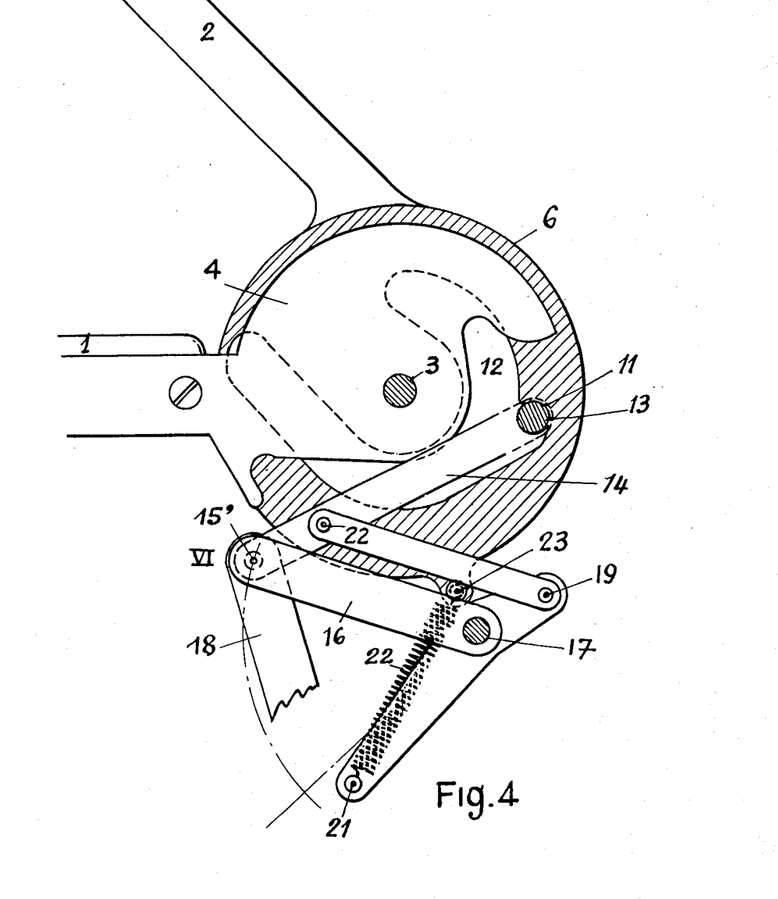
FIG. 4, a similar view, the raised hinged element being shown descending upon the lowered element.

When the arm 18 descends by the third thrust, the pin 13 engages fully in the notch 11 and causes the plate 6 to rotate in anti-clockwise direction until it reaches the intermediate position shown in FIG. 4 (POS VI). At this point, the cover 2 is urged by its own weight and is lowered by itself on to the seat 1. The parts have returned to the initial positions shown in FIG. 1 and the cycle of operations is complete. The successive operations are:

(*a*) Raising of the seat and cover by the first upward thrust of the arm 18;

(*b*) Lowering of the seat alone by the second thrust;

(*c*) Lowering of the cover by the third thrust;

This does not preclude the possibility, should the situation arise, of moving the seat or cover by hand when these are in any position without risk of forcing the mechanism or of damaging parts of moulded plastic material since both seat and cover may be thus produced.

Figure 5:
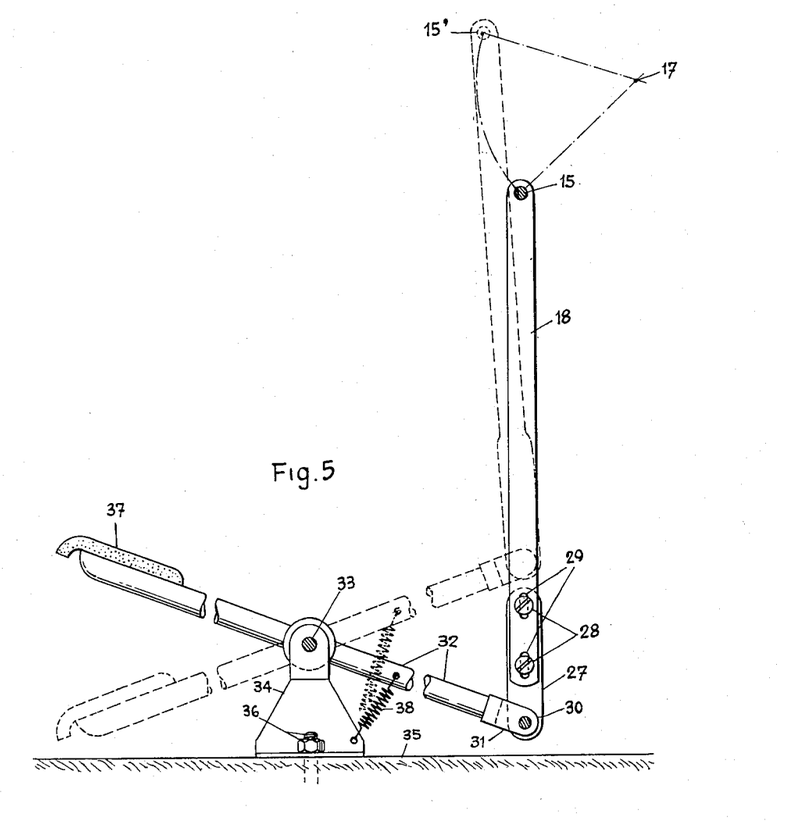
FIG. 5 is a diagram of a mechanical pedal control of the selector mechanism.
Figure 6:
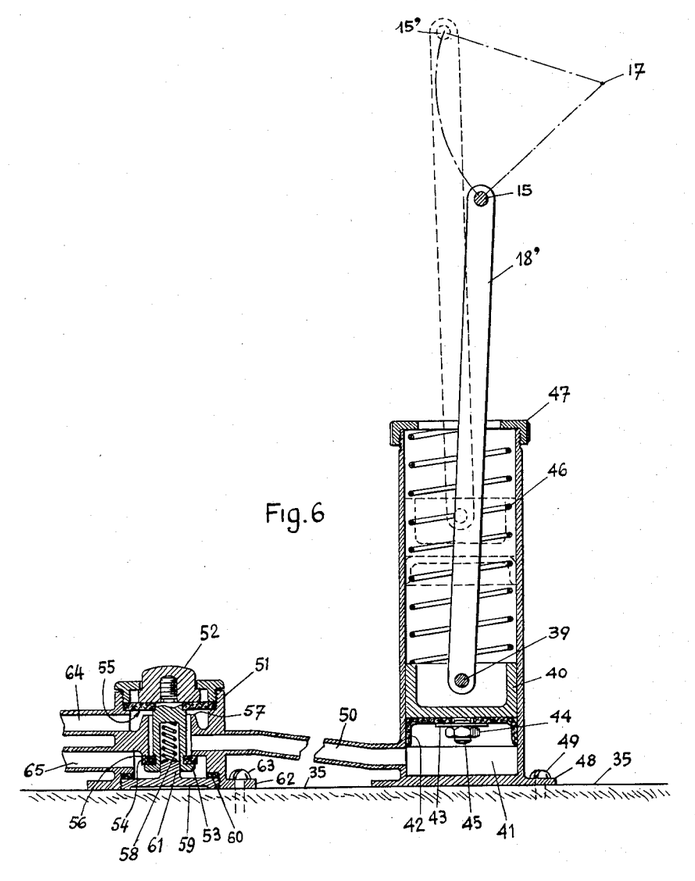
FIG. 6 is a diagram of a modified form of the invention with hydraulic control of the selector mechanism.
Figure 7:
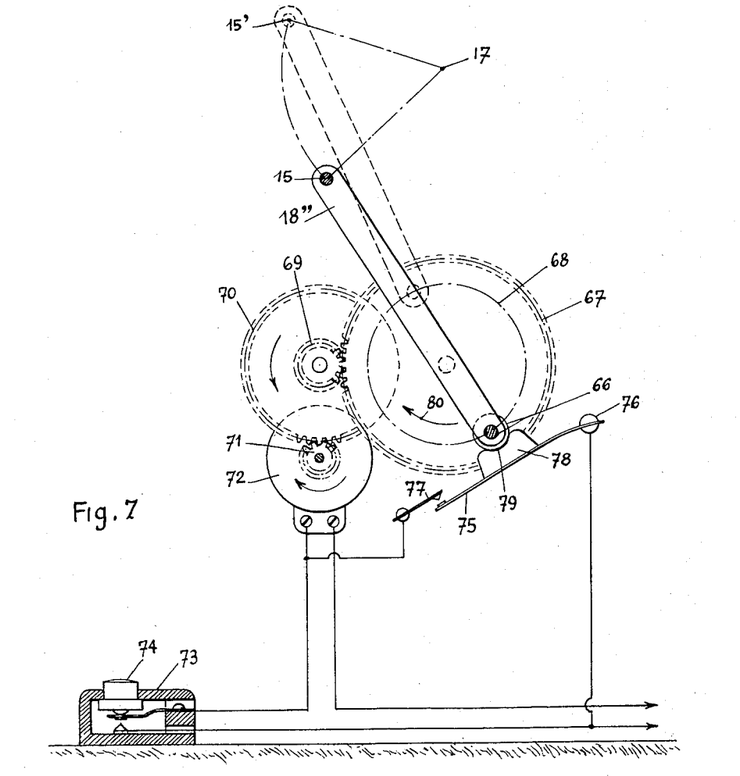
FIG. 7 is a diagram of a further modified form of the invention with electrical control.

FIGS. 5, 6 and 7 show the three possible methods envisaged of controlling the upward movement of the main arm 18, FIG. 5 shows direct mechanical operation by pedal; at its lower part the arm 18 possesses a regulable portion comprising a terminal portion 27 secured to the arm 18 by two screws 28 carried in slots 29 in the arm; by this arrangement it is possible to meet the differences in length which might exist between various types of bowls.

The lower extremity of this terminal portion is rotatably mounted in a fork-joint 31 forming the extremity of a beam 32 oscillating on a fulcrum 33 carried on a bracket 34 secured to the floor 35 by bolts 36. The other extremity of the beam 32 carries the pedal 37 which, when actuated by the foot of the user, causes the upper extremity of the arm 18 to describe the course following the arc 15—15'. A return spring 38 returns the beam to its initial position when the foot is removed from the pedal; the crank descends once more and resumes its lowered position shown in full lines in FIG. 5.

FIG. 6 illustrates a method of hydraulic operation; the arm 18' (counter part of the arm 18) has its lower extremity rotatably mounted on a pin 39 of a plunger 40 sliding within the fixed cylinder 41. A leather washer 42, secured to the piston by a metal washer 43, nut 44 and bolt 45 extending beneath the piston, ensures the tightness of the plunger. The plunger is returned to its downward position by the spiral spring 46 which is supported at one end against the plunger and at the other end against the cap 47 screwed to the upper part of the cylinder 41. This cylinder is secured to the floor 35 by the flange 48 and fixing screws 49.

Water under pressure is conveyed to the cylinder 41 or evacuated therefrom, through the lead 50 and control valve 51; this latter comprises a double-seat valve controlled by the foot, and which connects the cylinder 41 either to the source of pressurised water (when the button 52 is depressed by the foot) or to the exhaust lead (when this pressure is relaxed). The control button 52 actuates the working unit 53 comprising two rubber washers forming valve-seats; one 54 at the lower part of the fitting and the other 55 at the upper part. These washers are brought in turn into contact with their respective seatings 56 and 57. A spring 58 carried within the working unit normally urges the washer 54 against its seating 56, the washer 55 being removed from its seating 57. A base 59 screwed to the body of the control valve 51 with provision of a sealing ring 60, possesses at its center a cylindrical portion 61 which serves as guide to the working unit 53 and provides an abutment for the spring 58. A flange 62 secures the valve to the floor by means of fixing screws 63.

In the rest position the cylinder 41 communicates with the exhaust lead 64 through the valve 55 which is normally removed from its seating. The spring 58, assisted by the pressure of the water, maintains the washer 54 against its seating 56, i.e. in the closed position. When the button 52 is depressed (by the foot) the spring 58 is compressed and the washer 55 is urged against its seating 57 while the washer 54 is removed from its seating 56. The cylinder 41 thus communicates with the pressure lead 65 and not with the exhaust lead 64.

The water under pressure reaches the cylinder 41 and raises the plunger 40 which conveys the arm 18' upwards, the upper extremity of said crank describing the arc 15—15'. The spring 46 is compressed between the piston 40 and the cap 47.

When the pressure of the user's foot on the button 52 is relaxed the spring 58 returns the parts of the working unit to their original positions, the washer 54 being closed while the washer 55 is again opened. The water under pressure ceases to enter the cylinder 41 and the pressure of the spring 46 compels the plunger 40 to evacuate the water from the cylinder through the exhaust lead 64. The plunger 40 descends once more drawing with it the arm 18', the upper extremity of which returns from 15' to 15. This operation is repeated for each motion of the arm.

FIG. 7 shows a diagram of a method of electrical control. In this case the lower extremity of the arm 18" is articulated on a pin 66 riveted eccentrically to the face of a gear wheel 67; the circumference of the eccentric circle 68 described by the pin is such that the other extremity of the arm 18" describes the arc 15—15' described in one outward and one inward thrust for one revolution of the wheel 67. The teeth of this wheel 67 are driven through suitable reducing gears provided between the electric motor 72 with its drive pinion 71 and said wheel 67.

The motor is connected to the mains supply via two switches the first of which is of the press-button type 73, secured for example to the floor and controlled by the foot, the button 74 of insulating material making contact when pressed downwards. This sets the mechanism in operation. The second switch relays the first; it is controlled by the gear 67 and comprises a strip 75 anchored on the one hand at a fixed point 76, its other extremity, which is unattached, making or breaking contact with a tongue 77. An abutment 78 of insulating material integral with the strip 75 and located between this strip and the pin 66 temporarily separates the strip from the tongue 77 when the pin arrives opposite the abutment (lowered position of the arm 18), thus breaking the electric circuit.

A recess 79 in the abutment 78 is provided to maintain the crank in that position. When the button 74 is pressed, the motor rotates, driving the gear 67 in the direction shown by the arrow 80; after a certain point the pin 66 disengages from the abutment 78; the strip 75 is no longer held at a distance from the tongue 77 and electrical contact is thus established between the motor and the mains in parallel with the switch 73. From this moment onwards the foot may be removed from the button 74; the current is not cut thereby and the motor continues to rotate until the gear 67 has completed a full turn, whereupon the pin 66 once more strikes the abutment 78 and thus breaks the contact between the strip 75 and the tongue 77. The motor 72 stops. The friction of the pin 66 on the abutment 78 brakes the movement and the recess 79 on said abutment anchors the pin at the lowest point. During the complete revolution of the wheel 67 the pin 66 has firstly pushed the arm 18″ upwards, then brought it once more downwards during which its upper extremity has described the arc 15—15′ and on the return stroke 15′—15, irrespective of the duration, which may be very short, of the pressure applied by the foot of the user.

It will be realised that, with one of these three control devices, it is possible to produce, by simple foot pressure on the pedal 37, button 52 or button 74 according to the embodiment selected, upward and downward movements of the upper extremity of the arm 18, 18′ or 18″ following the arc-shaped course 15—15′. Each time by employing the selector mechanism, one of the three movements of the cycle of operation of the hinged elements is obtained successively in a certain order, without touching any part with the hands.

Figure 8:
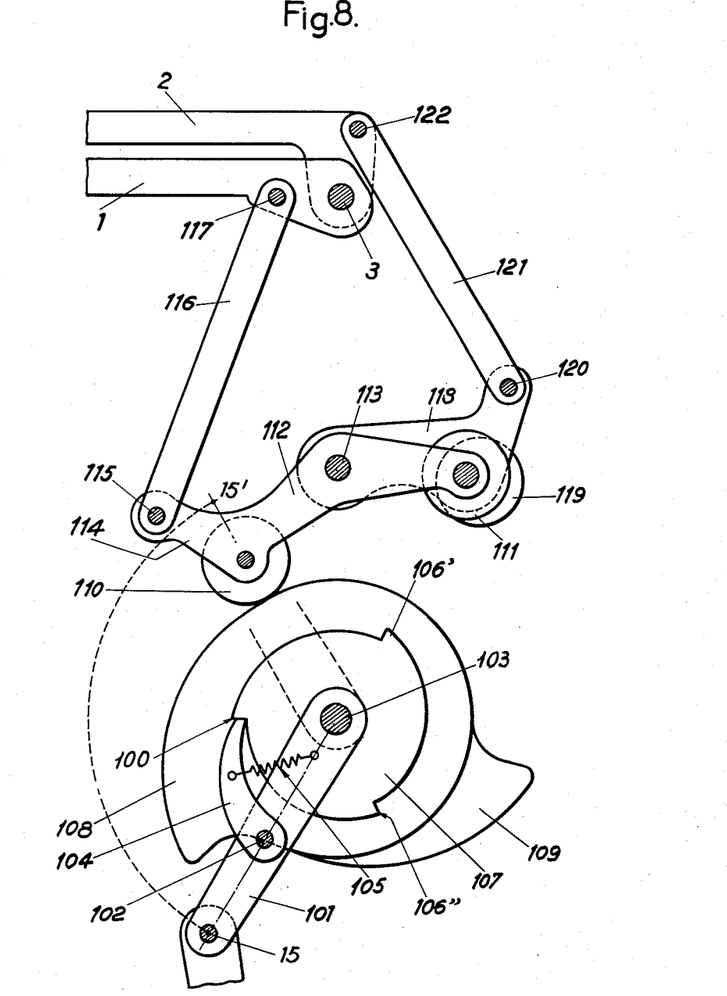
FIGS. 8, 9 and 10 are diagrams showing a form of selector mechanism comprising a cam with double cam formations.
Figure 9:
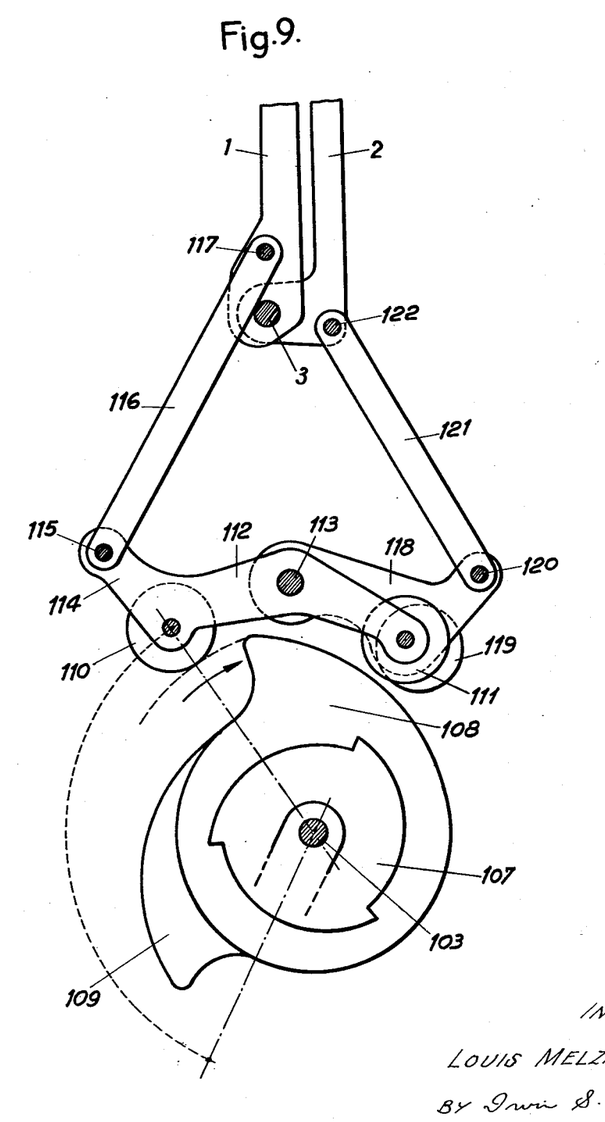
Figure 10:
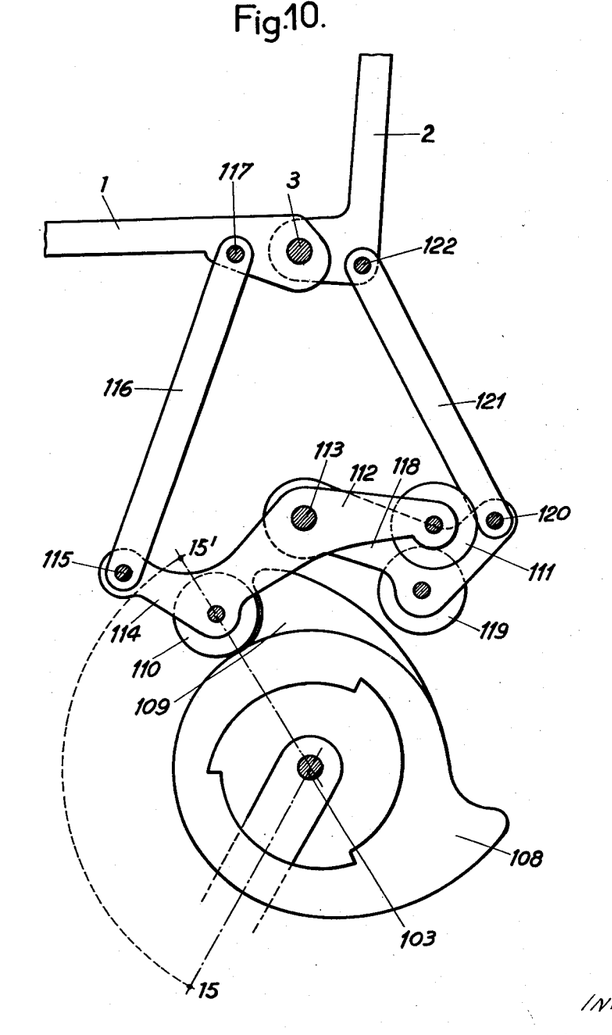

FIGS. 8, 9 and 10 show another form of selector mechanism in which the main arm 18 actuates a cam with two formations offset axially in such a manner as to determine respectively the angular movements of the seat and of the cover. A crank drives the cam through a pawl and ratchet device pivotably carried on an intermediate arm which itself is rotatably mounted at one extremity on the head of the main arm 18 and at the other, on the general axis of rotation of the cam.

The arm 18 (see FIG. 8) is therefore articulated at 15 to one extremity of the intermediate arm 101 which at its other extremity rotates on the general axis 103 of the cam 107. Also, at 102, the arm 101 carries approximately at its center, the rotatable pawl 104 resiliently controlled by the spring 105 which urges it constantly towards the axis 103 so that it engages in one or other of the ratchet teeth 106, 106′ or 106″ of the first edge of cam 107. The cam comprises two further edges 108 and 109 each provided with a hook-shaped formation actuating the rollers 110, 111 and 119 respectively which are situated in their respective plane of rotation. The rollers 110 and 111 are idly mounted at the two extremities of a lever 112 forming a reversing device capable of oscillating around the fixed pivot point 113. This reversing device also carries an extension 114 articulated at 115 on the arm 116, the other extremity of which is articulated at 117 to the arm integral with the seat 1.

Furthermore, an arm 118 constituting the control lever for the cover 2 is mounted on the fixed pin 113. The arm 118 carries the roller 119 located in the plane of rotation of the cam edge 109. It is provided with in extension at the end of which the arm 121 is rotatably mounted which arm is itself articulated at 122 to the lever of the cover 2.

Manner of operation: In FIG. 8 the various parts are in the rest position with seat and cover lowered. When the arm 18 rises until its head passes from 15 to 15′ as before, by means of its pawl 104 it causes the cam 107 to rotate on the pin 103; the eccentric formation 108 thus pushes back the roller 110 causing the lever 112 to swing in clockwise direction; this raises the seat and consequently also the cover; the parts assume the position shown in FIG. 9.

The arm 18 descends once more alone because it is not rigidly connected to the cam; on its next upward thrust, however, it clicks into engagement with the cam; as the cam rotates once again it causes its formation 108 to push back the roller 111 which is located in its plane of rotation, and was lowered by raising of the seat (swing of the lever 112). The lever 112 swings this time in the opposite direction, this is possible because the roller 110 is no longer in contact with any formation. The seat 1 is thus lowered without the cover 2 following (FIG. 10). The formation 109 rotates without touching the roller 110 which does not lie in its plane of rotation. The arm 18 can once more descend alone.

On its third upward movement, rotation of the cam causes the formation 109 to push back the roller 119, thus lowering the cover 2. The parts have now returned to their original position.

It is manifest that it is possible within the framework of the invention to provide the hinged elements with counterweights or compensating springs which will assist in reducing the effort necessary for raising and will produce a certain shock-absorbing effect, by friction for example, in the case where closing of the seat or cover might occasion too sudden a shock.

Although, in the foregoing description, a sequence of operations has been described involving, on one hand the raising of the two hinged members in company, and on the other hand the individual and successive lowering of them, it is to be understood that this sequence could be readily reversed without, in any way, departing from the spirit of the invention. That is to say, the selector mechanism could be arranged to raise the members individually and in succession and to lower them together.

I claim:

1. An actuating device for a pair of hinged members such, for example, as the co-axially hinged seat and seat cover of a sanitary flush bowl, comprising a reciprocable thrust arm eccentrically disposed in relation to the hinge axis, selector mechanism interconnecting the thrust arm and the hinged elements for converting reciprocation of the thrust arm into rotary hinging of the elements, and control means operable to effect reciprocation of the thrust arm, said selector mechanism consisting of a pair of coaxial cams rotatable relatively to each other about the hinge axis, each rotatable with a hinged element, and each including a pair of notches spaced around the pivotal axis, a notch of one cam being coincident with a notch of the other cam and the remaining two notches being out of alignment with each other in a radial direction, pivotal follower means on the thrust arm guided by both cams into the notches, and a tension spring connected to one of the cams intermediate its notches and to the follower means so as to maintain the follower means selectively in engagement with one or other of the non-aligned notches or in engagement with the coincident notches during the thrust stroke of each of three successive reciprocations and to move the follower means into one or other of the non-aligned notches or into the co-incident notches during the return stroke of each reciprocation, in readiness for the thrust stroke of the next reciprocation.

2. A device according to claim 1, wherein the follower means comprises a pivotally mounted radius arm, a pivotal connection between the radius arm and the thrust arm to guide the thrust arm in its reciprocating movement, an auxiliary arm pivoted to the thrust arm and carrying the cam follower, and a lever having its pivot co-axial with the radius arm pivotal mounting and having one lever arm connected to the tension spring and the other lever arm parallel to the auxiliary arm and connected thereto by a link parallel to the radius arm.

3. An actuating device for a pair of hinged members such, for example, as the co-axially hinged seat and seat cover of a sanitary flush bowl, comprising a reciprocable thrust arm eccentrically disposed in relation to the hinge axis, selector mechanism interconnecting the thrust arm and the hinged members for converting reciprocation of the thrust arm into rotary hinging of the members, and control means operable to effect reciprocation of the thrust arm, said selector mechanism consisting of a rotatable cam with a pair of peripherally and axially spaced cam formations thereon, pawl and ratchet mechanism connected to the thrust arm and to the cam to effect stepwise rotation of the cam at each reciprocation of the thrust arm, a lever rockable about a pivot intermediate its ends, a pair of cam followers mounted at the ends of the lever and engageable successively by a cam formation on two successive rotational steps of the cam, an operative connection between the lever and one of the hinged members so that the latter is hinged in opposite directions on the two successive rotational steps of the cam, a rocker arm carrying a cam follower engageable by the second cam formation, and an operative connection between the rocker arm and the second hinged member so that the latter is hinged on the third rotational step of the cam.

4. The combination of two members arranged to overlie one another and both being pivotally mounted on axes in the region of corresponding edges thereof, an actuator movably disposed in relation to the pivotally mounted edges, a selector device coupling said actuator with both members for converting movement of said actuator into rotary movement of said members, said selector device consisting of a part adapted to engage operatively both members simultaneously on one side of their axes to turn them in one direction by one operation of the actuator, a change-over device to engage said part operatively with both members on the other side of their axes to turn them in the opposite direction, and a lost-motion device whereby said part operatively engages with and turns the two members in said opposite direction one after the other on succeeding operations of said actuator.

5. The subject matter of claim 4, in which the selector device comprises two plates mounted one on each member to turn with that member about its rotational axis, two stops on each plate arranged respectively on opposite sides of said axis, a swinging endwise-moveable thrust-member engageable at its free end with the stops, means to constrain the thrust member on its first actuation to engage simultaneously with the stops on one side of the axes of both plates, biasing means operative on return of the thrust member to swing it to the opposite side of the axes of both plates, and further constraining means to locate the free end of the thrust member on successive end-wise actuating movements to engage successively with the stops on said opposite side of the axes of both plates.

6. The subject matter of claim 4, in which the selector device comprises a hinged lever connected to the actuator to be oscillated thereby about a fixed axis, a pawl mounted to oscillate in company with the hinged lever, a stepped cam advanced step-by-step by the pawl, cam followers mounted at opposite ends of a bell crank which is coupled by a link to one of the two members, and a third cam follower mounted at the end of an arm that is pivotally mounted coaxially with the bell crank and is coupled by a link to the other member of the two members.

References Cited in the file of this patent

UNITED STATES PATENTS

| | | |
|---|---|---|
| 429,952 | Pratt | June 10, 1890 |
| 737,814 | Bacon | Sept. 1, 1903 |
| 1,276,472 | Zeen | Aug. 20, 1918 |
| 1,511,533 | Staszak | Oct. 14, 1924 |
| 1,792,811 | Bustin | Feb. 17, 1931 |
| 1,863,682 | Alberts | June 21, 1932 |
| 2,100,906 | Lefkowitz | Nov. 30, 1937 |
| 2,155,548 | Hompesch | Apr. 25, 1939 |
| 2,440,231 | Davidson | Apr. 20, 1948 |
| 2,849,728 | Gyllenberg | Sept. 2, 1958 |